United States Patent [19]

Bendickson et al.

[11] Patent Number: 4,502,664

[45] Date of Patent: Mar. 5, 1985

[54] MACPHERSON SPRING COMPRESSOR

[75] Inventors: Roy B. Bendickson, Racine; Raymond R. Zuzinec, Sr., Kenosha, both of Wis.

[73] Assignee: Snap-on Tools Corporation, Kenosha, Wis.

[21] Appl. No.: 471,896

[22] Filed: Mar. 3, 1983

[51] Int. Cl.[3] .................................................. B60P 1/48

[52] U.S. Cl. ...................................... 254/10.5; 29/227

[58] Field of Search .............. 29/227; 254/10.5, 29 R; 269/208, 211, 215, 239, 289 R

[56] References Cited

U.S. PATENT DOCUMENTS

| | | | |
|---|---|---|---|
| 3,814,382 | 6/1974 | Castoe | 254/10.5 |
| 3,902,698 | 9/1975 | Furrer et al. | 254/10.5 |
| 3,935,630 | 2/1976 | Roy | 29/227 |
| 4,009,867 | 3/1977 | Diffenderfer | 254/10.5 |
| 4,105,188 | 8/1978 | Mendoza et al. | 254/10.5 |
| 4,295,634 | 10/1981 | Spainhour et al. | 254/10.5 |
| 4,395,020 | 6/1983 | Spainhour | 254/10.5 |

*Primary Examiner*—Frederick R. Schmidt
*Assistant Examiner*—Judy J. Hartman
*Attorney, Agent, or Firm*—Emrich & Dithmar

[57] ABSTRACT

A MacPherson strut spring compressor has a drive mechanism to move a strut clamp assembly toward and away from the front of the frame. Upper and lower positioning assemblies are vertically movable with respect to the frame to accommodate MacPherson struts of different sizes and spring offsets, with the upper positioning assembly being vertically adjustable independently of the lower positioning assembly and the lower positioning assembly being vertically adjustable with respect to frame. There is also disclosed locking mechanism for each of the positioning assemblies to retain the MacPherson strut in place during operation of the compressor.

16 Claims, 6 Drawing Figures

MACPHERSON SPRING COMPRESSOR

BACKGROUND OF THE INVENTION

The need for a tool to compress coil springs is well known in the art. The need for such tools has become even more important since more and more vehicles having independent suspensions are now in use. Many of these vehicles, particularly foreign made automobiles, use a Macpherson-type strut suspension which is particularly useful because of its weight saving features. The coil springs are compressed between a pair of plates and support a substantial part of the vehicle weight. In the after market, the independent suspensions must be serviced, particularly the shock absorber cylinder which in the MacPherson-type suspension is located within the coil spring. Various devices are available in the market to permit removal of the shock absorber cylinder from the coil spring but almost all of the them have significant drawbacks.

Some of the prior art devices compress the spring in an unbalanced manner, resulting in the possibility of the spring being unevenly compressed which may be hazardous. Others involve devices which are light weight and portable but of insufficient size to handle all of the MacPherson-type strut assemblies presently on the market or too flimsy to provide adequate safety to the user. Oftentimes the tools are acceptable for their intended purpose, but are not reliable for heavy duty such as in garages where MacPherson-type strut suspensions are now being serviced with increasing frequency in the market due to the popularity of the MacPherson-type strut suspension in a high percentage of automobiles.

Several prior art devices involve the use of the pneumatic cylinders and the like all of which are cumbersome, heavy, expensive and introduce the need for safety latches and the like to prevent catastrophic accidents in the event of a loss of compressing fluid.

SUMMARY OF THE INVENTION

The present invention is directed to a spring compressor tool which accommodates MacPherson-type strut assemblies of various sizes, yet provides a safe and efficient tool which ensures that the user will not be exposed to a hazardous condition due to uneven compression of the spring during disassembly and reassembly of the strut assembly and other causes.

In summary, there is provided a MacPherson strut spring compressor for compressing the spring of a MacPherson strut assembly comprising a frame having drive mechanism mounted at one end thereof connected to a strut clamp assembly movable toward and away from the one end in response to operation of the drive mechanism, upper and lower positioning assemblies carried by the frame for vertical movement with respect thereto to accommodate MacPherson strut assemblies of different sizes, the upper positioning assembly being vertically adjustable independently of the lower positioning assembly, the lower positioning assembly being vertically adjustable with respect to the frame, whereby the upper and lower positioning assemblies cooperate to support and retain MacPherson strut assemblies of different sizes and spring offsets while maintaining the longitudinal axis of the MacPherson strut assembly substantially horizontal such that operation of the drive mechanism causes the strut clamp assembly to move toward the one end thereby compressing the spring of the MacPherson strut assembly to permit disassembly of same, the strut clamp assembly including two pivotally mounted nesting members with a threaded locking device for maintaining the nesting members in place over the MacPherson strut assembly.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
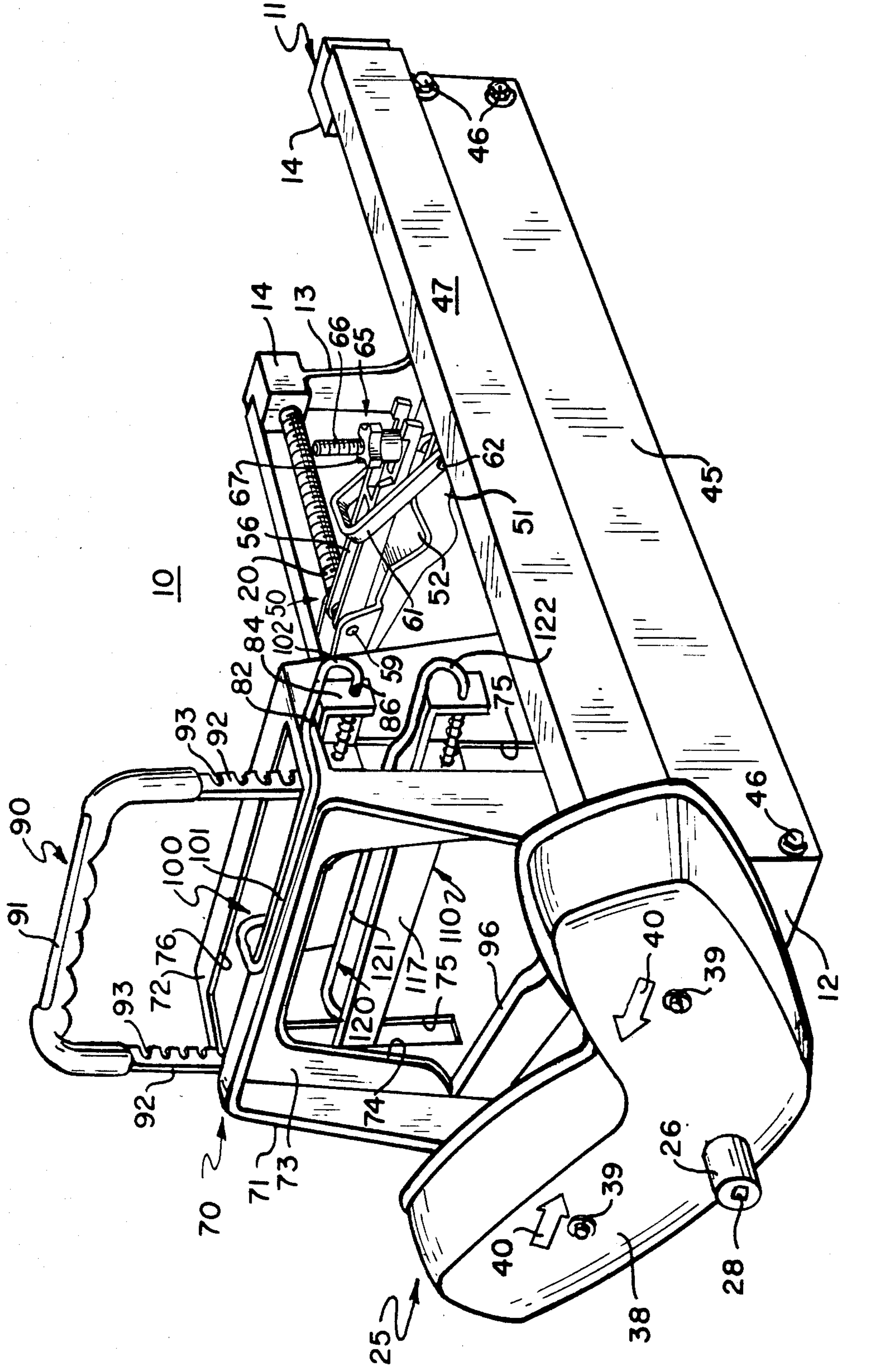
FIG. 1 is a perspective view of the MacPherson-type strut spring compressor of the present invention.
Figure 2:
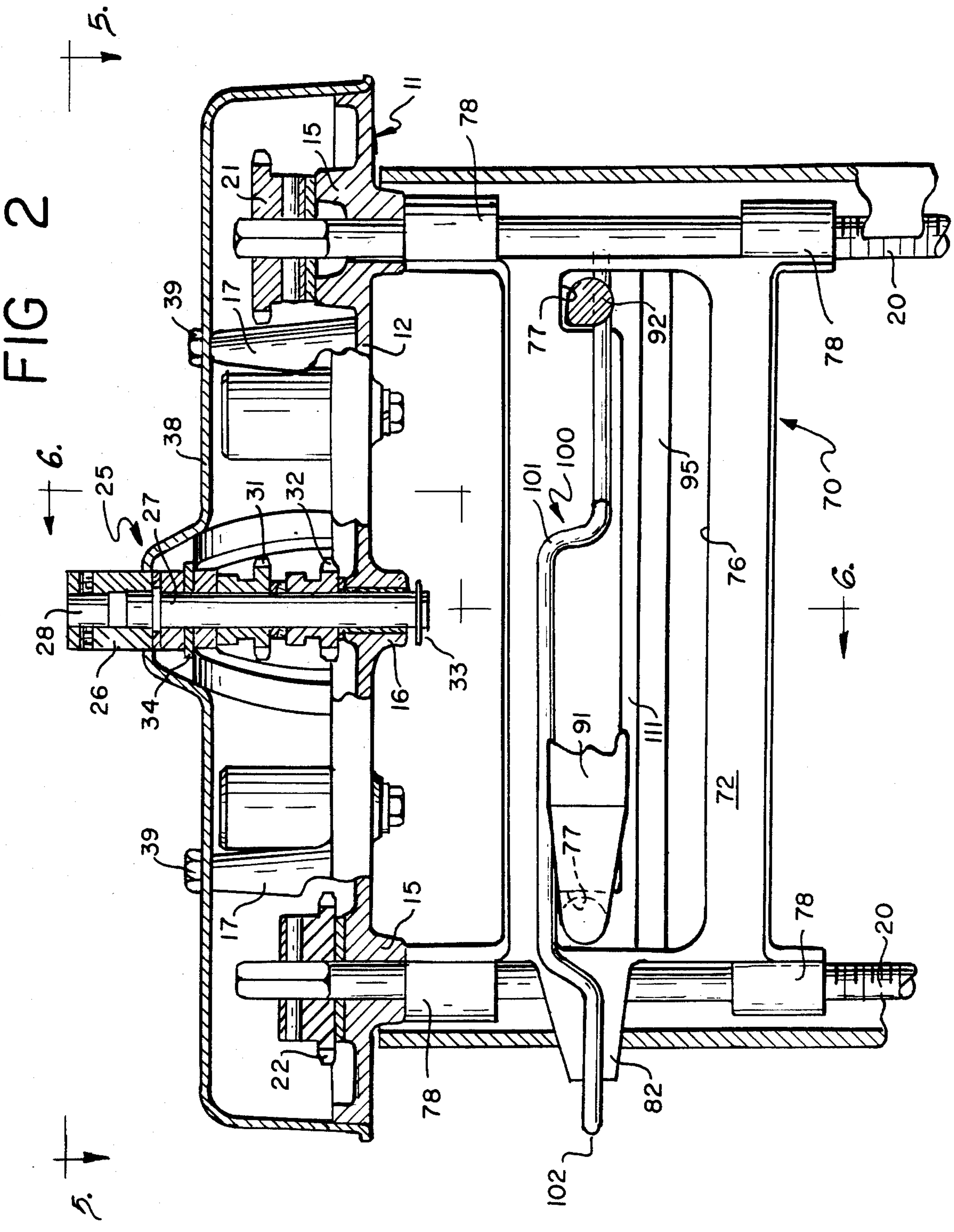
FIG. 2 is a top view partly in section of the front end of the MacPherson strut spring compressor illustrated in FIG. 1.
Figure 4:
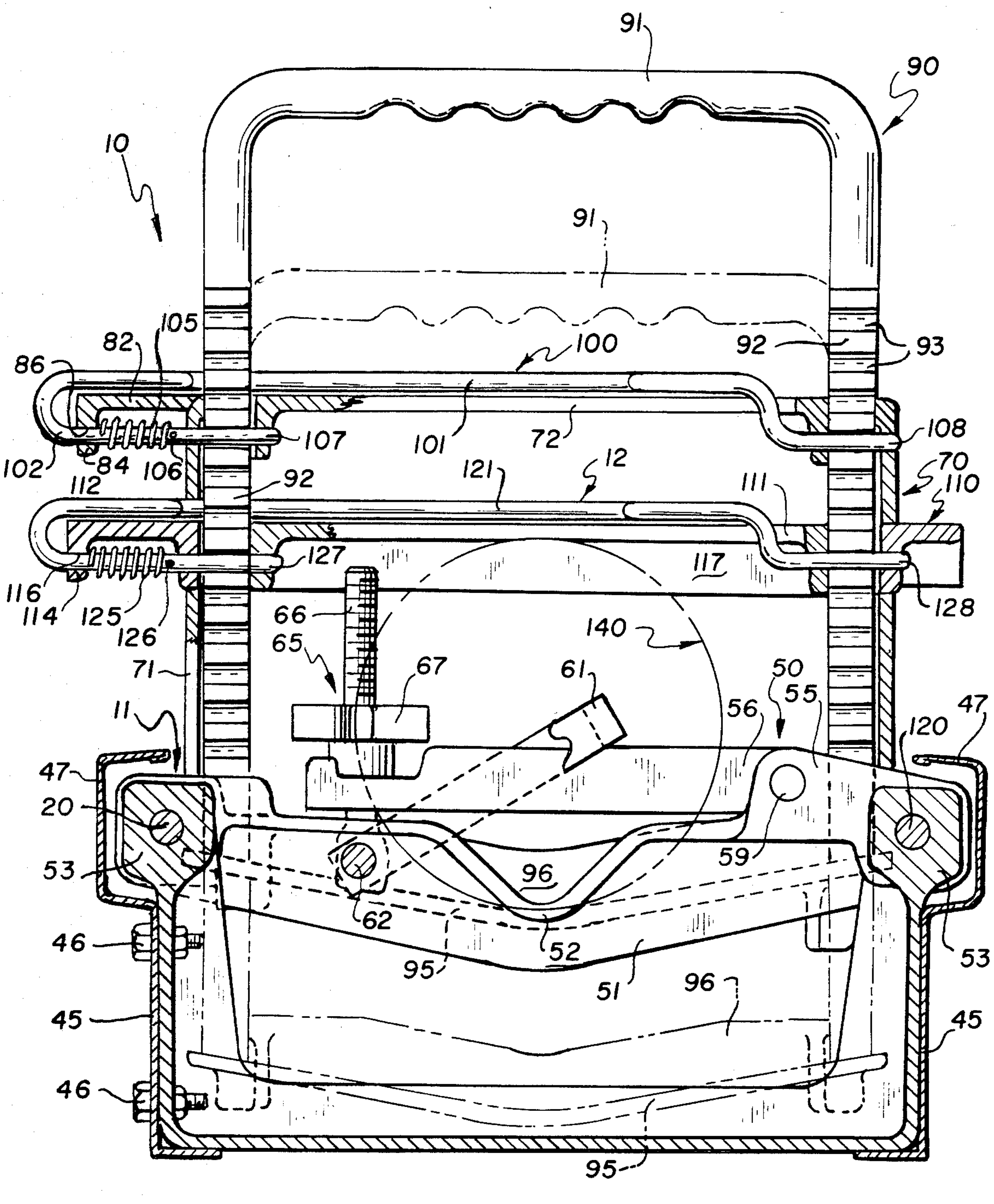
FIG. 4 is an elevational view partly in section of the MacPherson strut spring compressor as seen along line 4—4 in FIG. 3.

Referring now to the drawings, and particularly to FIGS. 1, 2 and 4 thereof, there is disclosed a MacPherson strut spring compressor 10 having a frame 11 including a front plate 12 (FIGS. 1 and 2) and a longitudinally spaced apart and parallel rear plate 13, (FIG. 1) the rear plate 13 carrying a pair of journals 14 and the front plate 12 having a pair of journals 15 (FIG. 2). The front plate 12 has a journal boss 16 (FIG. 2) extending in a direction toward the rear plate 13 and has two spaced apart forwardly extending internally threaded mounting studs 17 (FIG. 2).

A pair of compression screws 20 interconnect the front plate 12 and the rear plate 13 and more particularly extend from the pair of journals 14 on the rear plate 13 through the pair of journals 15 on the front plate 12. The compression screws 20 are fixed against longitudinal movement with respect to the journals 14 and the rear plate 13 by means such as fasteners, cotter pins or the like. The compression screws 20 each have mounted a pair of sprockets 21, 22 (FIG. 2) on the ends thereof extending through the front plate 12. As seen particularly in FIG. 2, the sprockets 21, 22, although identical in shape, are mounted in offset relation so as to position the teeth thereof at different distances with respect to the front plate 12. As seen, the sprockets 21, 22 are mounted to the compression screws 20 such that the teeth of the sprocket 21 are at a farther distance from the front plate 12 than are the teeth of the sprocket 22, all for a purpose hereinafter set forth.

Drive mechanism 25 (FIG. 2) is mounted on the front plate 12 of the frame 11 and serves to drive both compression screws 20 simultaneously. The drive mechanism 25 includes a drive sprocket sleeve 26 fixedly mounted on a main shaft 27, the sleeve 26 having an opening 28 at the front thereof. The sleeve 26 on the shaft 27 carries longitudinally spaced sprockets 31 and 32, the teeth of the sprocket 31 and the teeth of the aforesaid sprocket 21 lying in the same plane and the teeth of the sprocket 32 and the sprocket 22 lying in the same plane. Rings 33 and 34 on the main shaft 27 serve to maintain the shaft in place. It is clear that the shaft 27 extends through the boss 16 in the front plate 12 and is provided also with appropriate bushings, washers and the like to maintain the shaft in position.

Figure 5:
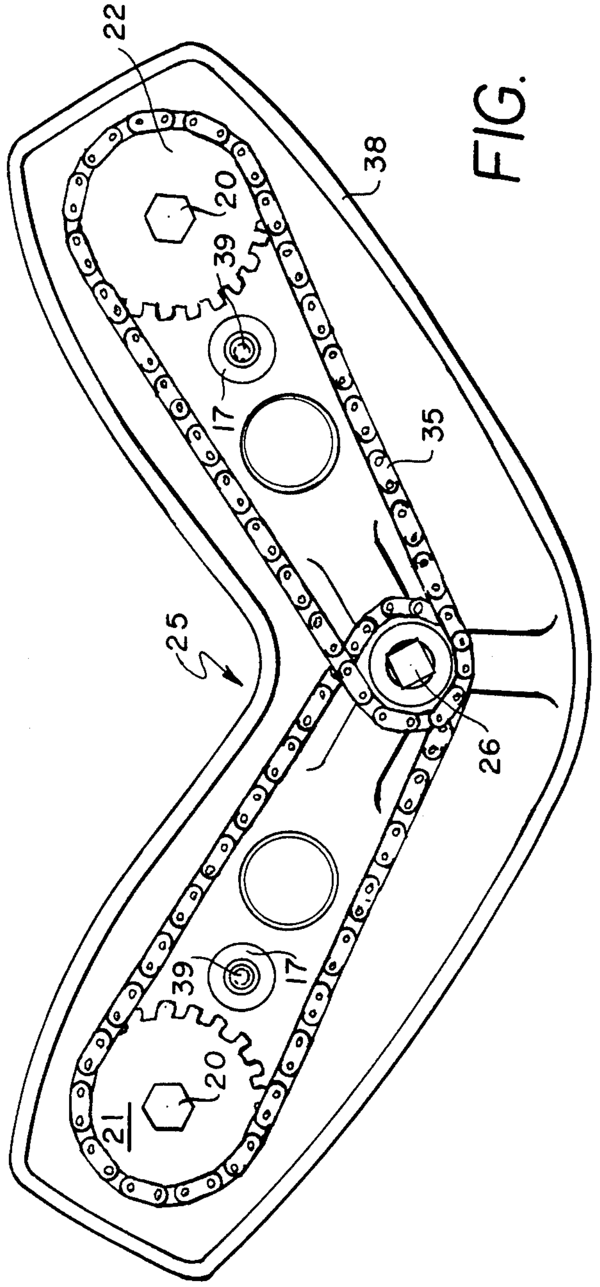
FIG. 5 is a front elevational view with the cover removed of the drive mechanism illustrated in FIG. 2, as seen along line 5—5 thereof.

Referring now to FIG. 5 it is seen that the drive mechanism 25 includes a pair of chains 35 operatively connecting respectively the sprockets 21, 31 and 22, 32. A front cover 38 (FIG. 2) is mounted to the front plate 12 of the frame 11 and maintained in position by means of fasteners 39 secured within the mounting studs 17. On the front of the front cover 38 are a pair of inwardly facing arrows 40, as best seen in FIG. 1, for a purpose hereinafter set forth.

Finally, the frame 11 is provided with a pair of side panels 45 (FIG. 1) having an upper channel portion 47 extending longitudinally of the frame 11 to protect the user from contact with the compression screws 20. The side panels 45 extend the length of the frame 11 and are secured thereto by a plurality of fasteners 46, as seen in FIGS. 1, 4 and 6.

Figure 3:
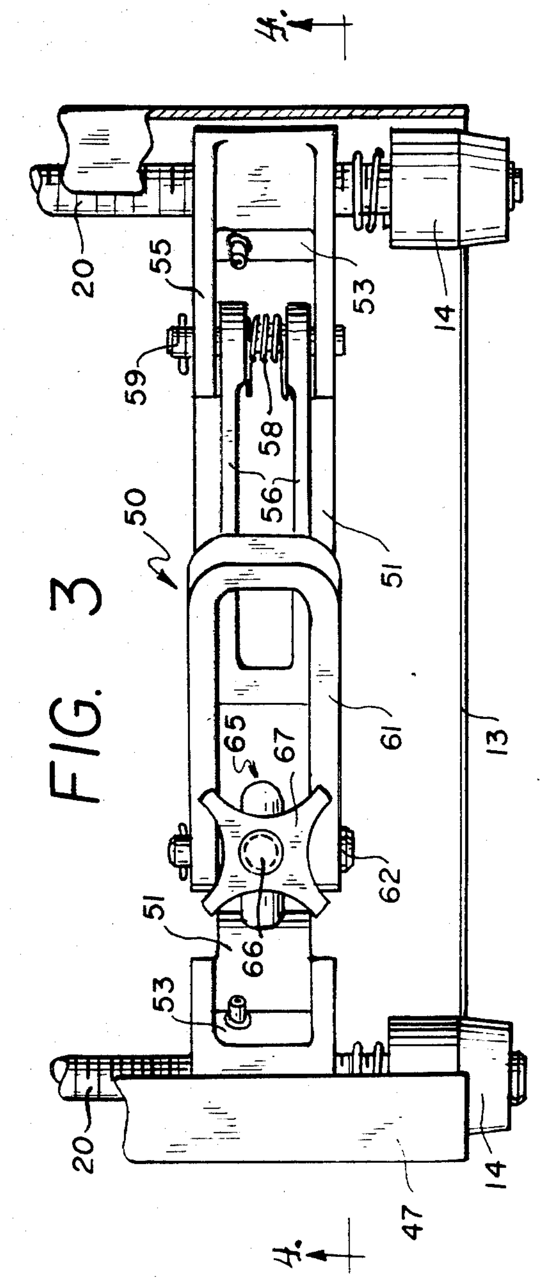
FIG. 3 is a top plan view, partly broken away, of the strut clamp assembly portion of the MacPherson strut spring compressor illustrated in FIG. 1.

The MacPherson strut spring compressor 10 further includes a strut clamp assembly 50 (FIGS. 3 and 4) having a body portion 51 which is generally V-shaped with a central support portion 52 and is mounted on the pair of compression screws 20 by a pair of threaded bushings 53. An upper portion of the body 51 is formed into a clevis 55 on which is pivotally mounted a latch 56, see FIGS. 3 and 4, the latch 56 being normally spring biased upwardly by a coil spring 58 (FIG. 3) mounted on pivot pin 59. On the other side of the body portion 51 is a generally U-shaped retainer 61 (FIGS. 3 and 4) pivotally mounted to the body 51 by a pivot pin 62.

Finally, a lock member 65 is provided to maintain the strut clamp assembly in the locked position thereof, as illustrated in FIG. 4. The lock member 65 includes an externally threaded bolt 66 and a spinner 67, the bolt 66 being pivotally mounted on the pin 62. As may be seen from the drawings, the strut clamp assembly 50 in the locked position thereof has the U-shaped latch 56 trapped in a nearly horizontal position by having the retainer 61 positioned thereover with the lock member 65 having the spinner 67 spun downwardly on the threaded bolt 66 until the spinner 67 contacts the latch 56.

Figure 6:
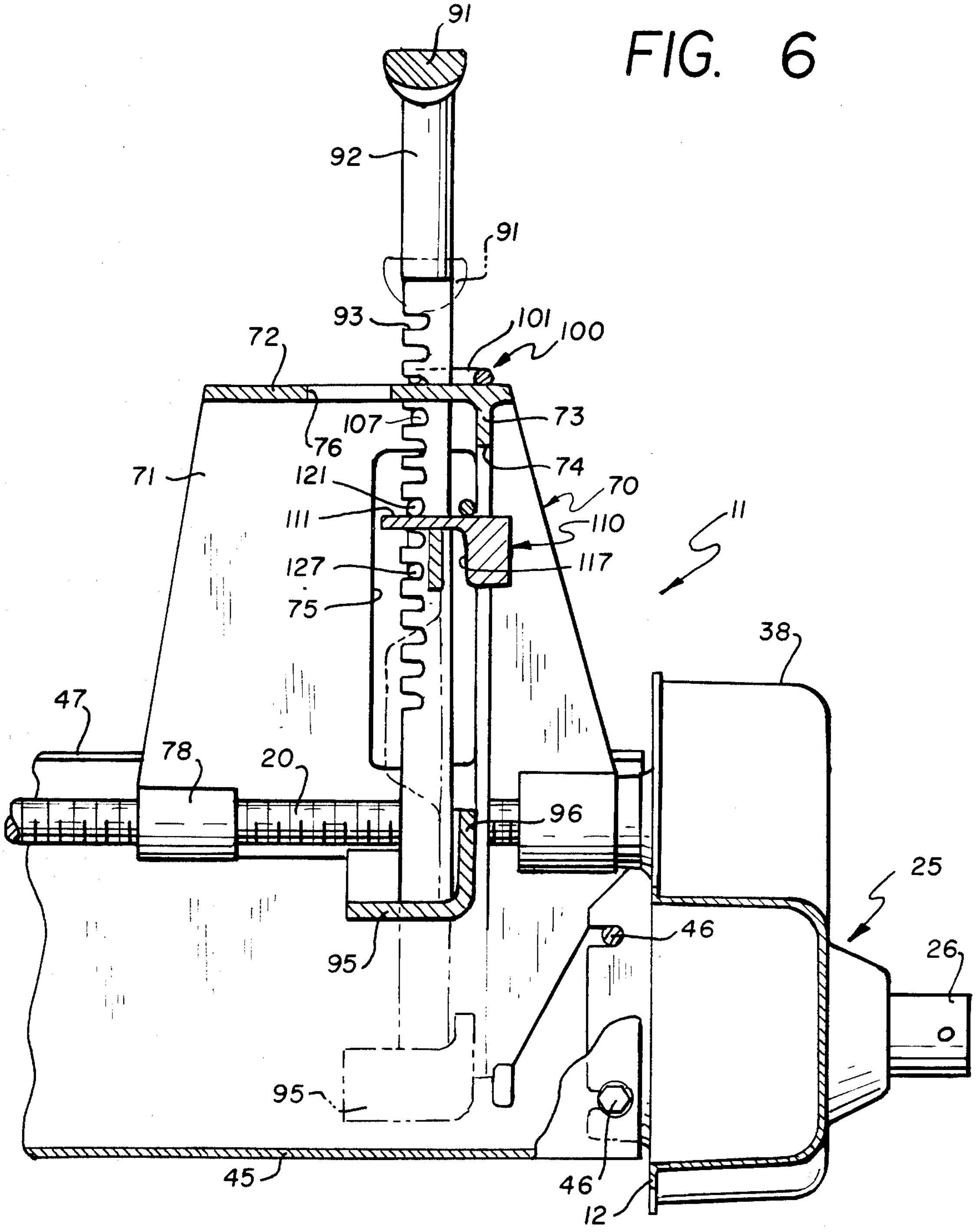
FIG. 6 is a fragmentary view partly in section of the spring compressor illustrated in FIG. 2 taken along line 6—6 thereof.

Referring now to FIGS. 1, 2 and 6 there is illustrated a carriage 70 freely and slidably mounted on the frame 11 and more particularly on the compression screws 20, the carriage having a pair of opposed side walls 71 connected by a top 72 integral with a plate 73 having a large central opening 74 therein. Each of the side walls 71 has a vertically extending slot 75 therein and the top 72 is also provided with a large transversely extending slot 76 therein, the slot 76 having two forwardly extending leg portions 77, as best seen in FIG. 2. The carriage 70, as before stated, is freely and slidably mounted on the two compression screws 20 by four bushings 78. Finally, the carriage 70 which is an integral one-piece casting has an upper support arm 82 with a downwardly extending flange 84 (FIG. 4) having an aperture 86 therein. The upper support arm 82 extends from the right hand side of the one-piece carriage 70, as seen in FIG. 1.

A lower positioning assembly 90 includes a handle 91 integrally connected to a pair of transversely spaced apart and parallel uprights 92 each provided with a plurality of vertically spaced apart notches 93 therein. Connecting the uprights 92 at the bottom of the lower positioning assembly 90 is a V-shaped support ledge 95 and V-shaped stop plate 96, see FIGS. 1, 4 and 6. The ledge 95 extends generally horizontally and the stop plate 96 extends vertically, thereby to provided support and stop surfaces for a MacPherson strut end plate. As seen in FIG. 2 the uprights 92 fit within the leg portions 77 of the slot 76 in the carriage top 72.

A locking mechanism 100 is provided for the lower positioning assembly 90 and includes an irregularly shaped rod 101 which has a downwardly extending portion 102 (FIGS. 1 and 2) that wraps around the outwardly extending support arm 82 of carriage 70. The rod 101 extends through the aperture 86 in the downwardly extending flange portion 84 of the support arm 82 and thereafter extends toward the associated upright 92 and is of a shape and dimension to fit within the associated notches 93, all as best seen in FIGS. 4 and 6. The locking mechanism 100 and more particularly the rod 101 is spring biased to the locked position thereof (FIG. 4) by means of a coil spring 105 wrapped around the portion of the rod 101 which lies between the carriage side wall 71 and the downwardly extending flange 84 of the support arm 82. The spring 105 is maintained in place by passing an end thereof through a hole 106 in the rod 101 with the other end thereof being trapped against the flange 84, thereby continually urging the rod 101 to the locked position thereof.

As seen in FIG. 4 of the drawings, the rod 101 has a portion thereof overlying the carriage top 72 and has a portion thereof lying underneath the top 72, thereby to prevent the lower positioning assembly 90 from vertical movement when the rod ends 107 and 108 are firmly seated within the respective notches 93 of the uprights 92. It should be noted that the end portions 107 and 108 of the rod 101 lie in the same horizontal plane so that the lower positioning assembly 90 is locked on both sides of the carriage 70 by means of contact between the rod end portions 107, 108 and the associated notches 93 and that the associated notches 93 are on the same horizontal plane thereby resulting in a stable configuration.

Upper positioning assembly 110 is mounted on the lower positioning assembly 90 and is vertically movable with respect thereto. The upper positioning assembly 110 has a horizontally extending support plate 111 which has an outwardly extending support arm portion 112 having a downwardly extending flange 114 at the distal end thereof. The support arm portion 112 and the flange 114 have about the same outward extent beyond the carriage side wall 71 as do the upper support arm 82 and flange 84. There is also provided an opening 116 extending through the downwardly extending flange 114 of the same size and shape as the aforesaid opening 86. Finally, there is integral with the plate 111 a downwardly extending stop plate 117 (FIG. 4) against which can bear the end plate of an associated MacPherson strut.

A locking mechanism 120 is provided for the upper positioning assembly 110 and serves to vertically position the upper positioning assembly 110 on the lower positioning assembly 90 at vertically spaced apart fixed locations. The locking mechanism 120 includes a sinuous rod 121 having a downwardly extending portion 122 and two end portions 127 and 128, all of the same size and shape as the previously described rod 101. Rod 121 is also provided with a hole 126 into which the end of a spring 125 is fastened, the other end of the spring 125 bearing against the downwardly extending flange 114 of the support arm portion 112, thereby to urge the locking mechanism 120 into the locked position thereof, FIG. 4, wherein the end portions 127, 128 fit within associated notches 93 of the uprights 92, thereby to vertically lock the upper positioning assembly 110 in place.

As seen, the upper positioning assembly 110 is mounted on the lower positioning assembly 90. The lower positioning assembly 90 is vertically movable between a plurality of vertically spaced apart discrete positions with respect to the carriage 70 and hence the frame 11. The upper positioning assembly 110 is vertically movable with respect to the lower positioning assembly 90 as well as with respect to the carriage 70 and the frame 11. The upper positioning assembly 110 is independently and vertically movable with respect to the lower positioning assembly 90, all to accommodate the MacPherson strut assemblies 140, see FIG. 4, of various sizes.

In operation, the strut clamp assembly 50 (FIG. 1) is moved toward the rear plate 13 of the frame 11 by operation of the drive mechanism 25. A pneumatic tool is preferably used although hand cranking is adequate if a pneumatic tool is unavailable. In any event, a tool is inserted into the non-circular opening 28 of the sleeve 26 to rotate the shaft 27 (FIG. 2) and hence the sprockets 31, 32 which through means of the chains 35 (FIG. 5) drive the associated sprockets 21, 22 which are fixedly mounted on the ends of the compression screws 20, thereby causing the compression screws 20 turn and drive the strut clamp assembly 50 rearwardly toward the rear plate 13. Then, the lower positioning assembly 90 is moved so that the support ledge and stop plate 96 are at the lowest position possible by releasing the locking mechanism 100 by pulling the curved portion 102 of the rod 101 outwardly away from the downwardly extending flange 84 of the support arm 82 thereby causing the end portions 107, 108 to move to the left as seen in FIG. 4 and to the right as seen in FIG. 1 to disengage the end portions from the associated notches 93. Thereafter, the entire lower positioning assembly 90 may be moved vertically downwardly to its lowest position.

After the lower positioning assembly 90 has been placed, the upper positioning assembly 110 is moved to its uppermost position by repeating the procedure with the locking mechanism 120 so as to disengage the end portions 127, 128 of the rod 121 from the associated notches 93 in the uprights 92, thereby permitting the entire upper positioning assembly 110 to be moved vertically upwardly so as to enlarge the vertical distance between the plate 111 of the upper positioning assembly 110 and the V-shaped support ledge 95 of the lower positioning assembly 90.

A MacPherson strut assembly 140 (FIG. 4) which has been previously removed from a vehicle for repair is then positioned with the end plate of the strut lying on the support ledge 95 of the lower positioning assembly and abutting against the stop plate 96. The other end of the MacPherson strut assembly 140 is placed on the arcuate support portion 52 of the strut clamp assembly 50; thereafter, the strut clamp assembly 50 is closed by moving the U-shaped latch 56 from its upward spring biased position to the horizontal position as illustrated in FIG. 4, and thereafter the retainer member 61 is placed over the latch 56 and the lock member 65 is brought into place. The spinner 67 is spun downwardly on the blot 66 until it contacts the arms 57 of the latch 56 to retain same in place thereby firmly to clamp the MacPherson strut assembly 140 in place.

The upper positioning assembly 110 is then adjusted downwardly by moving the locking mechanism 120 to its unlocked position allowing vertical movement of the upper positioning assembly 110 relative to the uprights 92 until the plate 111 comes in contact with the MacPherson strut assembly 140 and the stop plate 117 is also in contact with the front of the MacPherson strut assembly end plate. At this time, as seen in FIG. 4, the MacPherson strut assembly 140 is firmly trapped by cooperation of the support ledge 95 of the lower positioning assembly 90 and plate 111 of the upper positioning assembly 110 and is prevented against longitudinal movement by means of the stop plate 96, the stop plate 117 and the strut clamp assembly 50. However, the MacPherson strut assembly 140 is not yet in position for disassembly since it is important that the longitudinal axis of the MacPherson strut assembly 140 be positioned horizontally. To this end, the locking mechanism 100 is again released to allow vertical movement of both the lower positioning assembly 90 and the upper positioning assembly 110 carried thereby until the central axis of the MacPherson strut assembly 140 lies on a line indicated by the arrows 40 (FIG. 1) on the front cover 38 of the drive mechanism 25. When this positioning has been achieved, the lower locking mechanism 100 is released thereby automatically causing the end portions 107, 108 to contact the appropriate notches 93 of the uprights 92 firmly to lock the upper and lower positioning assemblies against vertical movement. At this stage, the MacPherson strut assembly 140 is in position to be disassembled.

Disassembly of the MacPherson strut assembly 140 is accomplished by compressing the coil spring (not shown) by the MacPherson strut assembly to allow the center rod to move through the front plate of the assembly so that the retaining nut which holds the MacPherson strut assembly together can be removed. In order to accomplish this, the appropriate pneumatic tool is inserted into the opening 28 of the sleeve 26 and the shaft 27 is driven, thereby causing the sprockets 21, 22 to rotate the associated compression screws 20. As the compression screws 20 rotate, the strut clamp assembly 50 is drawn toward the carriage 70 and the front plate 12 of the frame 11. As the strut clamp assembly 50 is drawn toward the front plate 12 of the frame 11, the MacPherson strut assembly 140 is prevented from movement by upper and lower positioning assemblies 110 and 90. The use of a single power source to simultaneously drive the two compression screws 20 keeps the MacPherson strut assembly in alignment. Because of the large forces generated by the coil spring of the MacPherson strut assembly 140, is is imperative that the assembly remain in alignment during compression so that dangerous accidents do not occur.

After the MacPherson strut assembly 140 has been compressed enough, the retaining nut on the center rod is available to the operator for removal. After the retaining nut has been removed, then the drive mechanism 25 is reversed so as to move the strut clamp assembly 50 toward the rear plate 13 of the frame 11 thereby allowing the MacPherson strut assembly 140 to expand. The length of the MacPherson strut spring compressor 10 is designed so that most MacPherson strut assemblies 140 are free of spring tension when the strut assembly 50 is at the rear plate 3. Thereafter, the MacPherson strut assembly 140 can be removed from the spring compressor 10 for the required maintenance.

For instance, the hydraulic cylinder of a MacPherson strut assembly 140 often needs replacement or repair and after such is accomplished, then the repaired MacPherson strut assembly is respositioned in the spring compressor 10 and the strut clamp assembly 50 is locked, as previously described. Thereafter, the drive mechanism 25 is actuated to cause, as explained hereinbefore, the strut clamp assembly 50 to once again move towards the front plate 12, thereby compressing the spring of the repaired MacPherson strut assembly 140 until the threaded end of the center rod is again available at which time the retaining nut is rethreaded onto the rod. Then the drive mechanism 25 is again reversed to drive the strut clamp assembly 50 toward the rear plate 13. However, because the MacPherson strut assembly 140 is now under tension, the strut clamp assembly 50 need not be closely located to the rear plate 13 in order for the entire MacPherson strut assembly to be removed from the spring compressor 10.

While there have been described what at present is considered to be the preferred embodiment of the present invention, it will be understood to those skilled in the art that various modification and alterations may be made therein without deparating from the spirit and scope of the present invention which is intended to be defined in the claims appended hereto.

What is claimed is:

1. A MacPherson strut spring compressor for compressing the spring of a MacPherson strut assembly comprising a frame having drive mechanism mounted at one end thereof connected to a strut clamp assembly movable toward and away from said one end in response to operation of said drive mechanism, upper and lower positioning assemblies carried by said frame for vertical movement with respect thereto to accommodate MacPherson strut assemblies of different sizes, said upper positioning assembly being vertically adjustable independently of said lower positioning assembly, said lower positioning assembly being vertically adjustable with respect to said frame, whereby said upper and lower positioning assemblies cooperate to support and retain MacPherson strut assemblies of different sizes and spring offsets while maintaining the longitudinal axis of the MacPherson strut assembly substantially horizontal such that operation of said drive mechanism causes said strut clamp assembly to move toward said one end thereby compressing the spring of the MacPherson strut assembly to permit disassembly of same, said strut clamp assembly including two pivotally mounted nesting members with a threaded locking device for maintaining said nesting members in place over the MacPherson strut assembly.

2. The MacPherson spring compressor of claim 1, wherein said strut clamp assembly is mounted on parallel members which are driven simulaneously by said drive mechanism from a single power source.

3. The MacPherson spring compressor of claim 1, wherein said strut clamp assembly has a V-shaped portion for receiving and supporting the MacPherson strut thereon.

4. The MacPherson spring compressor of claim 1, wherein said upper positioning assembly is mounted on said lower positioning assembly.

5. A MacPherson strut spring compressor for compressing the spring of a MacPherson strut assembly comprising a frame having drive mechanism mounted at one end thereof connected to a strut clamp assembly movable toward and away from said one end in response to operation of said drive mechanism, a carriage mounted on said frame near said one end thereof, upper and lower positioning assemblies mounted on said carriage for vertical movement with respect thereto to accommodate MacPherson strut assemblies of different sizes and spring offsets, said upper positioning assembly being vertically adjustable independently of said lower positioning assembly, said lower positioning assembly being vertically adjustable with respect to said frame, locking mechanism cooperating with said upper and lower positioning assemblies for independently locking each of said upper and lower positioning assemblies at a selected vertical position with respect to said carriage, whereby said upper and lower positioning assemblies and said carriage cooperate to support and retain MacPherson strut assemblies of different sizes and spring offsets while maintaining the longitudinal axis of the MacPherson strut assembly substantially horizontal such that operation of said drive mechanism causes said strut clamp assembly to move toward said carriage thereby compressing the spring of the MacPherson strut assembly to permit disassembly of same, said lower positioning assembly including a support ledge and stop plate positioned between a pair of vertically extending uprights, said upper positioning assembly including a horizontally positioned top and a vertically extending stop plate slidably mounted on said pair of uprights for vertical movement therealong.

6. The MacPherson spring compressor set forth in claim 5, wherein said carriage is freely mounted on said frame for longitudinal movement therealong.

7. The MacPherson spring compressor of claim 5, wherein said upper positioning assembly is mounted on said lower positioning assembly and said lower position assembly is mounted on said carriage.

8. The MacPherson spring compressor of claim 7, wherein said vertically extending uprights have a plurality of notches therein vertically spaced therealong for cooperation with said locking mechanism, said locking mechanism including a rod of a dimension and shape to fit within said notches to restrain vertical movement of the associated positioning assembly with respect to said carriage.

9. The MacPherson spring compressor of claim 8, wherein said locking mechanism rod simultaneously fits within notches on both uprights to lock the associated positioning assembly.

10. A MacPherson strut spring compressor for compressing the spring of a MacPherson strut assembly comprising a frame having front and rear plates connected by a pair of longitudinally extending compression screw members, a drive mechanism mounted on said front plate operatively connected to said pair of compression screw members, a strut clamp assembly mounted on said compression screw members for movement therealong in response to operation of said drive mechanism, a carriage freely mounted on said compression screw members positioned in use near said front plate, upper and lower positioning assemblies mounted on said carriage for vertical movement with respect thereto to accommodate MacPherson strut assemblies of different sizes and spring offsets, said upper positioning assembly being vertically adjustable independently of said lower positioning assembly, said lower positioning assembly being vertically adjustable with respect to said frame, spring biased locking mechanism cooperating with said upper positioning assembly for locking same at a plurality of discrete vertically spaced apart locations, spring biased locking mechanism cooperating with said lower positioning assembly for locking same at a plurality of discrete vertically spaced apart locations, whereby said upper and lower positioning assemblies and said carriage cooperate to support and retain MacPherson strut assemblies of different sizes and spring offsets while maintaining the longitudinal axis of the MacPherson strut assembly substantially horizontal such that operation of said drive mechanism causes said strut clamp assembly to move on said compression screw members toward said carriage thereby compressing the spring of the MacPherson strut assembly to permit disassembly of same.

11. The MacPherson spring compressor of claim 10, wherein said drive mechanism includes a sprocket connected to each compression screw member, and a single drive sprocket operatively connected to both compression screw sprockets for simultaneously driving both compression screw members from a single power source connected to said drive sprocket.

12. The MacPherson spring compressor of claim 10, and further including a pair of side plates mounted on said frame maintaining said compression screw members out of contact with the user of the MacPherson spring compressor.

13. The MacPherson spring compressor of claim 10, wherein said lower positioning assembly includes a support ledge and stop plate positioned between a pair of vertically extending uprights and said upper positioning assembly includes a horizontally positioned top and vertically extending stop plate slidably mounted on said pair of uprights for vertical movement therealong.

14. The MacPherson spring compressor of claim 13, wherein said vertically extending uprights have a plurality of notches therein vertically spaced therealong for cooperating with said locking mechanisms, said locking mechanism each including a rod shaped and dimensioned to fit within said notches to restrain vertical movement of the associated positioning assembly with respect to said carriage.

15. The MacPherson spring compressor of claim 14, wherein said locking mechanism for said lower positioning assembly includes a rod spring biased against said carriage continually urging said rod toward and into said notches in said uprights, a portion of said rod extending over and under the top of said carriage and intersecting notches in said uprights to fix the vertical position of said lower positioning assembly.

16. The MacPherson spring compressor of claim 14, wherein said locking mechanism for said upper positioning assembly includes a rod spring biased against said carriage continually urging said rod toward and into notches in said uprights, a portion of said rod extending over and under said top of said upper positioning assembly and intersecting notches in said uprights to fix the vertical position of said upper positioning assembly.

* * * * *